United States Patent Office 2,935,418
Patented May 3, 1960

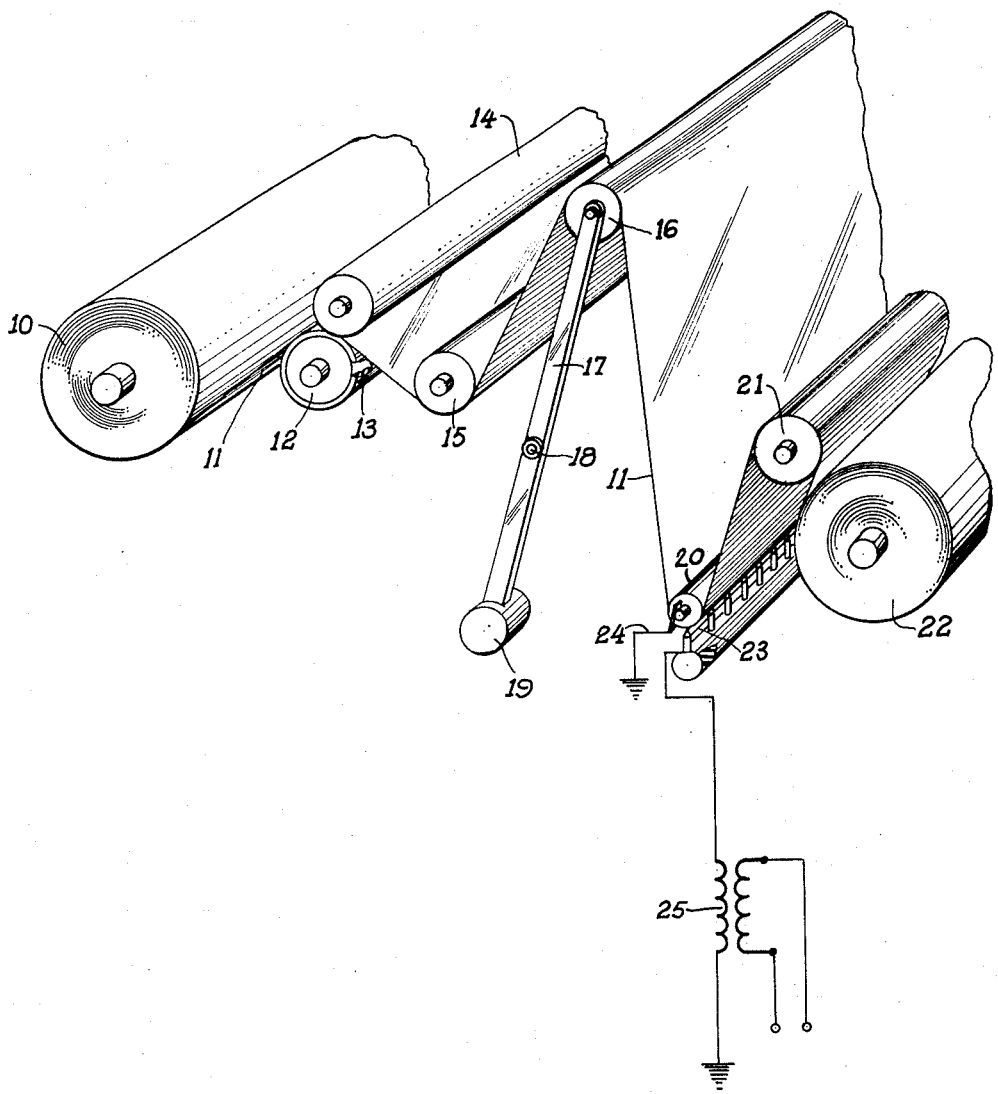

2,935,418

METHOD FOR TREATING PREFORMED POLYETHYLENE WITH AN ELECTRICAL GLOW DISCHARGE

George H. Berthold, Guilford, and Anderson Pace, Jr., Hamden, Conn., assignors to Olin Mathieson Chemical Corporation, a corporation of Virginia Application June 3, 1953, Serial No. 359,352

3 Claims. (Cl. 117—47)

This invention relates to a method of treating sheets and other articles of plastic material to improve the anchorage or adherence characteristics of the surfaces thereof. More particularly, the invention is concerned with a method of treating polyethylene sheets or articles to improve the anchorage or adherence characteristics of the surfaces thereof whereby various coating materials including printing inks applied thereto are tightly adhered thereto.

The use of polyethylene in various structural forms has greatly increased in the last few years because of its many advantageous characteristics. For example, in the packaging field it is becoming ever more widely used in the form of sheeting or film as well as in the form of tubes, envelopes, bags, flexible bottles and the like because of its transparency, insolubility in many solvents, relatively low cost, flexibility, etc. For many uses, such as those suggested in the packaging field, it is frequently desired to apply to the polyethylene structure a coating. Such coatings may be printing inks or various coatings to increase the transparency of the polyethylene, to increase the heat-sealing properties thereof, to increase or decrease the stiffness thereof, to provide a reduced surface coefficient of friction, or to modify the gas permeability properties thereof, etc. In most instances, as is the case with printing inks, it is desirable to apply the coatings directly and permanently to the surfaces of the polyethylene structures. In order to accomplish this satisfactorily, however, it is necessary that such coatings adhere tightly to the surface of the structures so that they will not readily scrape, peel, or wear off.

The natural, untreated surface of a polyethylene structure is, however, inherently non-adherent to the various coating materials referred to above. A number of ways in which to improve the anchorage characteristics of the surfaces of polyethylene structures have been investigated. However, prior methods have not been uniformly and consistently effective for the desired purpose and have involved other disadvantages such as undesirable changes in the material treated, complex equipment or excessive cost.

The principal object of this invention is to provide a method of treating polyethylene articles so that the surface characteristics thereof are modified to improve their adherability to various coating compositions. A further object of the invention is to modify the surface characteristics of polyethylene to improve the adherability thereof without altering the various other characteristics of the material, such as its tensile strength, gauge, stiffness, elongation, chemical properties, etc.

According to the invention, a surface of the article, the anchorage or adherence characteristic of which is to be improved, is subjected to a high frequency, high voltage electric discharge for a brief interval of time. Advantageously, the voltage of the discharge is such that a corona or glow discharge is formed and the surface of the structure to be treated is located within the field thereof during treatment. As a continuous process is contemplated, the invention contemplates the maintenance of a continuous discharge and a continuous passage therethrough of the surface of the structure to be treated.

More specifically this invention comprises the establishment of a high-frequency, high-voltage glow discharge from a single substantially knife-edged electrode and the continual passage through the field thereof transversely of the electrode of the surface portion of the polyethylene article to be treated.

For a more detailed description of the invention, reference may be had to the accompanying drawing in which there is diagrammatically illustrated in perspective an apparatus by which the method of the invention may be carried out. An apparatus similar in principle at least to the apparatus here only diagrammatically illustrated is fully disclosed and claimed in copending application Ser. No. 359,351, filed June 3, 1953, issued April 14, 1959, as U.S. Patent 2,882,412, assigned to the assignee of the present application.

While the more detailed description of the invention will be set forth in connection with the treatment of polyethylene in sheet or film form, no limitation to the scope of the invention should attach by reason thereof, as polyethylene in other structural forms may equally as well be treated in accordance with the general principles of treatment here disclosed.

A roll 10 of polyethylene sheet material 11 which is to be treated is mounted for substantially free rotation. A driven roll 12 having a surface comprising a layer of rubber or like material 13 draws the sheet material 11 from roll 10. To maintain the sheet material in good frictional contact with the rubber surface layer 13 of drive roll 12, an idler roll 14 is provided which presses the sheet material 11 into tight contact with the surface of the roll 12. The sheet material then is passed beneath an idler roll 15 and thence over a freely rotatable tension roll 16 mounted at one end of a tension bar 17 which is pivotally supported on a pivot pin 18 and carries a counterweight 19 on its end opposite that supporting tension roll 16. The sheet material is then passed under a grounded roll 20, which will be more fully described hereinafter, and over another idler roll 21 from which it is drawn and wound upon a core 22 driven by a suitable, variable speed wind-up mechanism. In passing over grounded roll 20, the sheet material is subjected to a high-frequency, high-voltage corona discharge from a substantially knife-edged electrode 23 which extends transversely of the moving sheet. The proper tensioning of the sheet material throughout its passage from roll 10 to the wind-up arbor is effected by the tension bar 17 and tension roll 16 in combination with the variable speed windup mechanism.

Suitable constructions for grounded roll 20 as well as for electrode 23 are fully disclosed and described in the aforementioned copending application Ser. No. 359,351. However, it may be helpful to briefly describe both here.

The electrode 23 advantageously comprises a brass bar mounted on a support of insulating material and extending longitudinally of the grounded roll 20. The cross sectional shape of the bar may be that of a truncated triangle, the truncated surfce lying closest to the grounded roll. A tungsten wire may be firmly secured in a longitudinally extending recess formed in the truncated surface of the brass bar. Such an electrode may be considered as a substantially knife-edged electrode as its field of discharge will be very narrow compared to its length. The electrode 23 may be energized from a suitable source of electrical potential, here illustrated as a transformer 25.

The grounded roll 20 may advantageously be a chrome plated steel roll provided with carbon friction brushes at both ends to insure complete grounding, which has been diagrammatically illustrated at 24. Particularly when relatively thin sheet material is being treated, e.g., 1.5 to 2.0 mils in thickness, the grounded roll is covered with a dielectric material such as "Mylar" (polyethylene terephthalate) film to prevent arcing which would burn the sheet material being treated. Any width of sheet material may be treated, the width of the portion that may be treated by a particular electrode, however, depending upon the length of that electrode. If it is desired to treat a sheet of material, the width of which is less than the length of the electrode, then those portions of the surface of the grounded roll that lie opposite the electrode but are not covered by the sheet material should be covered to prevent excessive deterioration of the dielectric material covering those portions of the surface of the ground roll. Such protective covering may be in the form of any good dielectric material temporarily secured to such portions of the ground roll. Such a covering may, for example, consist of two layers of glass cloth along with an additional layer of "Mylar." If no dielectric covering is employed on the surface of the grounded roll beneath sheet material being treated, portions of the surface of the grounded roll that are exposed directly to the electrode during the treatment must still be covered to prevent arcing to those portions which would prevent formation of the necessary discharge across the sheet material.

In the operation of the above-described apparatus the sheet material 11 is first threaded through the apparatus as illustrated, the lead edge being secured to the core 22. When this has been accomplished, the electrode may be charged and the drive of the wind-up core 22 and drive roll 12 is initiated. The angular speed of the wind-up core 22 is varied to compensate for the constantly increasing diameter of the roll of treated material that builds up thereon, so as to maintain uniform velocity of the sheet material 11. Upon reaching the end of the roll 10 of material to be treated, the drive mechanism is stopped and the charging of the electrode discontinued. This should be done before the tail end of the sheet material passes the grounded roll 20, for, as above indicated, damage may be done to a dielectric covering on the surface of the grounded roll if the electrode is maintained in charged condition in the absence of sheet material between it and the grounded roll. From this it will be clear that a certain portion of the lead end of the sheet material as well as a certain portion of the tail end thereof may have to be scrapped, for it will necessarily be untreated.

It should be noted at this point that it is important, in order to maintain a constant gap between the discharge electrode and the material being treated, to maintain the sheet material continuously in good contact with the grounded roll. This of course is accomplished by maintaining the sheet material under a relatively constant tension during its passage through the apparatus.

A great deal of experimental and testing work has been done in the treatment of various forms of polyethylene sheet material. Various specific treatments, developed by us and that we have found to improve the anchorage or adherence characteristics of the surfaces of such polyethylene sheet materials will be set forth in detail below, but from our experimentation certain broad conditions for the treatment of polyethylene structures in general to improve the anchorage or adherence characteristics of the surfaces thereof have been deduced. While under certain conditions this improvement may be greater than under others, in all cases there will be a noticeable improvement of these characteristics over those exhibited by the polyethylene surfaces in untreated form. The conditions that must be primarily considered are the electrical conditions of the discharge from the electrode, namely, the voltage impressed between the electrode and the grounded roll, and the frequency and the current in the electrode circuit. We have found particularly that a relatively high frequency is essential. The size of the gap between the electrode and grounded roll is also important to obtaining an effective treatment, but this of course will vary primarily in accordance with the thickness of the material, the surface of which is to be treated. From a theoretical standpoint, any gap up to about an inch should be satisfactory, though in our experimental work, where the polyethylene that has been treated has been in the form of relatively thin sheet material having a thickness of not more than about 1/16 inch, considerably smaller gaps have been employed.

The speed of travel of the material through the field of discharge is also important from the point of view of obtaining the most effective treatment. In connection with the treatment of polyethylene in sheet or film form, we have found that improvement has been effected at speeds of travel of the film from about 40 feet per minute to about 240 feet per minute or more.

Broad electrical conditions in a discharge that may be used in the treatment of the surface of a polyethylene structure and give effective improvement in the anchorage or adherence characteristic thereof are as follows:

Voltage impressed upon electrode_____ About 3,000 volts to about 22,000 volts.
Frequency in the electrode circuit_____ About 500 cycles per sec. to about 17,500 cycles per sec.
Current in the electrode circuit__ About .0015 amp. to about .125 amp.

As indicated, some improvement at least will be achieved in the anchorage or adherence characteristic of the surface of a polyethylene structure when treated according to the method of the invention if the electrical conditions are maintained within the above-specified ranges. Such improvement may be evidenced by placing printing ink upon the treated surface, as by rolling such ink thereon to simulate the application that would be made by conventional printing equipment, the ink being one such as an aniline dye printing ink, and allowing the ink to dry. After drying, a strip of Scotch tape is applied to the so-treated surface with enough pressure to assure complete adhesion. The tape is then stripped at a constant rate and the improvement in the anchorage or adherence characteristic of the surface can be gauged by the amount of ink that is removed by the tape. An untreated surface, when subjected to such a test, will normally release large quantities of ink. To indicate a completely satisfactory treatment of plastic material by our treating process, we require a substantially 100% retention by the plastic material of the ink applied when subjected to such a test.

For the treatment of polyethylene in relatively thin sheet form, general limits for the size of the gap to be employed between the electrode and the grounded roll and for the speed of travel of the material through the field of discharge of the electrode are mainly dependent on the film thickness and the type of resin. Gaps of .020–.060 inch have been successfully used. However, for a relatively thin (e.g. 1.5–2.0 mils) sheet material made by the extrusion of film-forming grades of polyethylene, best results have been obtained with a gap of .030±.01 inch and with a speed of travel of at least 40 feet per minute and as high as 240 feet per minute or more. An upper limit for the speed of travel of such sheet material for treatment has not been determined. Calculated from these figures of material speed of travel, the actual time of treatment of any portion of the material ranges downwards from .01 second.

Specific examples of the treatment of polyethylene film of about .0015 inch in thickness which gave completely satisfactory results when subjected to the above-set-forth testing procedure will now be set forth.

*Example I*

Commercial quantities of polyethylene film of about

.0015 inch in thickness have been treated successfully between a 30 inch discharge electrode and 62 inch grounded roll under the following conditions:

Voltage impressed upon electrode ____ 7,000 volts.
Current in electrode circuit _____ .03 amp.
Frequency _____ 2,600 to 2,700 cycles per sec.
Gap between the electrode and grounded roll _____ .030±.010 in.
Speed of travel of film _____ 125 ft. per min.

*Example II*

Again using a 30 inch electrode and a 62 inch grounded roll, .0015 inch polyethylene film has been successfully treated under the following conditions:

Voltage impressed upon the electrode __ 7,000 volts.
Current in electrode circuit _____ .05 amp.
Frequency _____ 2,750 cycles per sec.
Gap between the electrode and grounded roll _____ .030±.01 in.
Speed of travel of film _____ 110 ft. per min.

*Examples III, IV, V and VI*

About 500 pounds of polyethylene film of approximately 1.5 mil. in thickness was successfully treated, some under each of the following sets of conditions:

|  | III | IV | V | VI |
|---|---|---|---|---|
| Voltage impressed upon electrode, volts | 14,000 | 7,000 | 14,000 | 7,000 |
| Current in electrode circuit, amps | .0074 | .0148 | .0049 | .08 |
| Frequency, cycles per sec | 2,750 | 2,600 | 2,750 | 2,750 |
| Gap between electrode and grounded roll, in | .030 | .030 | .030 | .030 |
| Speed of travel of film, ft. per min | 108 | 108 | 108 | 128 |

*Examples VII, VIII and IX*

Film-forming grades of polyethylene made by different manufacturers frequently have different properties. E. I. du Pont de Nemours sells a film-forming grade of polyethylene under the name "Alathon." A similar grade of polyethylene is sold by the Bakelite Corporation under the name "DYNH" but the properties of film made therefrom are somewhat different than those of film made from "Alathon." We have successfully treated film made wholly from each of the two types of polyethylene as well as film made from 50–50 mixtures thereof. The film treated was between 24 and 30 inches wide and between .0015 in. and .0020 in. in thickness. Following are the conditions of treatment of three samples of such film:

|  | VII | VIII | IX |
|---|---|---|---|
| Polyethylene film | 100% "Alathon" | 50% "DYNH"+50% "Alathon." | 100% "DYNH." |
| Voltage impressed upon electrode | 4,700 volts | 4,400 volts | 4,200 volts. |
| Current in electrode circuit | .085 amp | .067 amp | .054 amp. |
| Frequency | 2,600 cycles per sec. | 2,600 cycles per sec | 2,600 cycles per sec. |
| Gap between electrode and grounded roll | .035±.003 | .035±.003 | .035±.003. |
| Speed of travel of film | 125 ft. per min | 125 ft. per min | 125 ft. per min. |

Those of the above-set-forth examples of treated film that have been tested for physical properties such as tensile strength, coefficient of friction, elongation, stiffness and softness have exhibited no substantial change in any of these properties.

While in this description the medium filling the gap between the electrode and grounded roll has been considered as being air at normal temperature and pressure and this has also been the case in the various tests that have been made, it is of course possible that some other medium might be employed, though from the purely economic point of view air may be best, in that no additional apparatus need be employed to confine the medium. Furthermore it will be noted that the detailed discussion of our invention has been in connection primarily with the treatment of polyethylene in film form. However, the scope of the invention should not be limited by reason of these facts other than to the extent set forth in the appended claims. Nor should the scope of the invention be limited to exclude various other changes and modifications that are within the skill of those familiar with the art.

We claim:

1. In the treatment of a preformed polyethylene article to render a surface thereof adherent to coating compositions, a method comprising the steps of establishing an electrical glow discharge having a frequency of 0.5 to 17.5 kilocycles per second in a narrow elongated field, and passing said article through said discharge in a direction substantially transverse to said field, at a rate such that a surface of said article is exposed to the said discharge for a period not exceeding about a hundredth of a second.

2. In the treatment of preformed polyethylene sheet material to render a surface thereof adherent to coating compositions, a method comprising the steps of establishing an electrical glow discharge having a frequency of 0.5 to 17.5 kilocycles per second at a potential between 3 and 22 kilovolts in a narrow elongated field having a height of 0.02 to 0.06 inch, and passing said sheet material through said discharge in a direction substantially transverse to said field, at a rate such that a surface of said sheet is exposed to the said discharge for a period not exceeding about a hundredth of a second.

3. In the treatment of preformed polyethylene sheet material to render a surface thereof adherent to coating compositions, a method comprising the steps of establishing an electrical glow discharge having a frequency of about 2.6 to 2.7 kilocycles per second in a narrow elongated field having a height of about 0.03 inch, and passing said sheet material through said discharge in a direction substantially transverse to said field, at a rate such that a surface of said sheet is exposed to the said discharge for a period not exceeding about a hundredth of a second.

References Cited in the file of this patent

UNITED STATES PATENTS

| 2,000,684 | Allen | May 7, 1935 |
| 2,608,717 | Kay | Sept. 2, 1952 |
| 2,647,464 | Ebert | Aug. 4, 1953 |

FOREIGN PATENTS

| 510,068 | Belgium | Apr. 15, 1952 |

OTHER REFERENCES

"Nature," No. 4338, Dec. 20, 1952, pages 1075 and 1076.